US011428917B2

(12) United States Patent
Jarvius et al.

(10) Patent No.: US 11,428,917 B2
(45) Date of Patent: Aug. 30, 2022

(54) METHOD AND DEVICE FOR MICROSCOPY-BASED IMAGING OF SAMPLES

(71) Applicant: Q-LINEA AB, Uppsala (SE)

(72) Inventors: Jonas Jarvius, Uppsala (SE); Jan Grawé, Uppsala (SE)

(73) Assignee: Q-LINEA AB, Uppsala (SE)

( * ) Notice: Subject to any disclaimer, the term of this patent is extended or adjusted under 35 U.S.C. 154(b) by 159 days.

(21) Appl. No.: 16/956,767

(22) PCT Filed: Dec. 18, 2018

(86) PCT No.: PCT/EP2018/085692
§ 371 (c)(1),
(2) Date: Jun. 22, 2020

(87) PCT Pub. No.: WO2019/121815
PCT Pub. Date: Jun. 27, 2019

(65) Prior Publication Data
US 2020/0363616 A1    Nov. 19, 2020

(30) Foreign Application Priority Data
Dec. 20, 2017    (GB) ..................................... 1721430

(51) Int. Cl.
*G02B 21/00*    (2006.01)
*G02B 21/24*    (2006.01)
(Continued)

(52) U.S. Cl.
CPC ......... *G02B 21/006* (2013.01); *G02B 21/245* (2013.01); *G02B 21/361* (2013.01); *G02B 21/26* (2013.01)

(58) Field of Classification Search
CPC .. G02B 21/006; G02B 21/245; G02B 21/361; G02B 21/26; G02B 21/244;
(Continued)

(56) References Cited

U.S. PATENT DOCUMENTS 4,349,263 A * 9/1982 Uchidoi .................. G03B 9/62
396/250
4,422,747 A * 12/1983 Uchidoi .................. G03B 9/62
396/250
(Continued)

FOREIGN PATENT DOCUMENTS

EP    1 990 667    11/2008
EP    1990667 A1 * 11/2008 ........... G02B 21/002
(Continued)

OTHER PUBLICATIONS

Mikkel Brydegaard, et al., "Broad-band multispectral microscope for imaging transmission spectroscopy employing an array of Light-emitting diodes", Oct. 27, 2008 (Year: 2008).*
(Continued)

*Primary Examiner* — Philip P. Dang
(74) *Attorney, Agent, or Firm* — Wenderoth, Lind & Ponack, L.L.P.

(57) ABSTRACT

A method for performing microscopy-based imaging of samples comprises: loading a sample holder (100) onto a support (50) configured to receive the sample holder (100); moving the sample holder (100) in a first direction, from a starting position on a first strip of the sample holder (100), to move the sample holder (100) relative to an imaging line of a line camera (10), to capture an image of the first strip of the sample holder (100); monitoring a focal plane using an autofocus system (15) as the sample holder (100) is moved in the first direction; in response to a signal from the autofocus system (15), moving an objective lens (25) along the optical axis to adjust the focal plane; and moving the
(Continued)

sample holder (100) in a second direction, to align the imaging line of the line camera (10) with a position on a second strip of the sample holder (100).

18 Claims, 6 Drawing Sheets

(51) Int. Cl.
  *G02B 21/36* (2006.01)
  *G02B 21/26* (2006.01)
(58) Field of Classification Search
  CPC .............. G02B 21/367; G02B 21/002; B01L 2300/0654; B01L 2300/0803; B01L 2300/087; B01L 3/502715
  See application file for complete search history.

(56) References Cited

U.S. PATENT DOCUMENTS

| | | | |
|---|---|---|---|
| 5,922,282 A * | 7/1999 | Ledley | C12Q 1/04 422/50 |
| 6,689,998 B1 | 2/2004 | Bremer | |
| 7,355,698 B2 | 4/2008 | Shah | |
| 7,476,632 B2 * | 1/2009 | Olson | D04H 3/16 442/352 |
| 7,981,368 B2 * | 7/2011 | Laugharn, Jr. | B01F 31/80 366/127 |
| 8,021,848 B2 * | 9/2011 | Straus | G01N 33/58 435/7.1 |
| 9,084,784 B2 * | 7/2015 | Fallon | A61K 45/06 |
| 9,097,910 B2 * | 8/2015 | Ogi | G02B 21/365 |
| 9,107,419 B2 * | 8/2015 | Fallon | C11D 3/386 |
| 9,361,726 B2 * | 6/2016 | Noshi | A61B 6/462 |
| 9,386,211 B2 * | 7/2016 | Soenksen | H04N 7/183 |
| 9,506,105 B2 * | 11/2016 | Brown | C12Q 1/686 |
| 9,565,425 B2 * | 2/2017 | Shiohara | G03B 7/091 |
| 9,784,961 B2 * | 10/2017 | Wooder | G02B 21/365 |
| 9,964,501 B2 * | 5/2018 | Taicher | G01N 24/08 |
| 10,229,515 B2 * | 3/2019 | Ohishi | A61B 6/037 |
| 10,313,606 B2 * | 6/2019 | Hawes | G06T 5/006 |
| 10,317,666 B2 * | 6/2019 | Hawes | G02B 21/365 |
| 10,409,052 B2 * | 9/2019 | Liu | G02B 27/0075 |
| 10,591,409 B2 * | 3/2020 | Morrison | G02B 21/365 |
| 10,768,114 B2 * | 9/2020 | Franjic | G01N 21/6486 |
| 10,775,308 B2 * | 9/2020 | Stearns | G01N 21/6456 |
| 2004/0002085 A1 | 1/2004 | Schembri et al. | |
| 2006/0238765 A1 | 10/2006 | Shah | |
| 2007/0206847 A1 * | 9/2007 | Heumann | G06T 11/008 382/154 |
| 2009/0246078 A1 * | 10/2009 | Barnard | G01N 33/4905 422/400 |
| 2013/0100272 A1 | 4/2013 | Price et al. | |
| 2014/0125790 A1 * | 5/2014 | Mackie | G02B 21/32 348/79 |
| 2014/0313313 A1 | 10/2014 | Soenksen | |
| 2015/0293270 A1 * | 10/2015 | Jarvius | G02B 21/34 264/220 |
| 2019/0120887 A1 * | 4/2019 | Kikunaga | G01R 29/12 |
| 2019/0219693 A1 * | 7/2019 | Lieblich | A61B 8/483 |
| 2020/0163747 A1 * | 5/2020 | Park | A61L 27/222 |

FOREIGN PATENT DOCUMENTS

| | | | |
|---|---|---|---|
| WO | 2004/103563 | 12/2004 | |
| WO | WO-2004103563 A2 * | 12/2004 | ............ B01L 3/5025 |
| WO | 2017/216310 | 12/2017 | |
| WO | 2017/216312 | 12/2017 | |
| WO | 2017/216314 | 12/2017 | |

OTHER PUBLICATIONS

Marlene Fredborg, Real-Time Optical Antimicrobial Susceptibility Testing, Jul. 2013 (Year: 2013).*
Xinyun Liu, "Orientation control of Biological Cells Under Inverted Microscopy", Jan. 31, 2010 (Year: 2010).*
International Search Report and Written Opinion of the International Searching Authority, dated Jun. 5, 2019 in corresponding International Patent Application No. PCT/EP2018/085692.
Liu et al., "Orientation Control of Biological Cells Under Inverted Microscopy", ASME Transactions on Mechatronics, 16(5): 918-924 (2011).
Fredbord et al., "Real-Time Optical Antimicrobial Susceptibility Testing", Journal of Clinical Microbiology, 51(7): 2047-2053 (2013).
Brydegaard et al., "Broad-band multispectral microscope for imaging transmission spectroscopy employing an array of light-emitting diodes", Am. J. Phys. 77(2): 104-110 (2009).
UK Search Report, dated Jun. 14, 2018 in corresponding GB application No. 1721430.5.

* cited by examiner

METHOD AND DEVICE FOR MICROSCOPY-BASED IMAGING OF SAMPLES

The present invention relates to a device for microscopy-based analysis of samples. In some examples the device is able to detect the presence, amount, and/or absence of microscopic objects in a sample, such as microscopic biological objects.

It is important in various fields to be able to analyse samples quickly and efficiently and in particular to be able to detect and/or count small objects such as bioparticles, molecules, cells, and so on. However, there remains a need to further improve on the capabilities of methods and devices in this field.

According to a first aspect, the present invention provides a method for performing microscopy-based imaging of samples comprising:

loading a sample holder onto a support configured to receive the sample holder;

moving the sample holder in a first direction, from a starting position on a first strip of the sample holder, to move the sample holder relative to an imaging line of a line camera, to capture an image of the first strip of the sample holder;

determining (for example, monitoring) a focal plane using an autofocus system as the sample holder is moved in the first direction;

in response to a signal from the autofocus system, moving an objective lens along an optical axis to adjust the focal plane (if necessary); and moving the sample holder in a second direction, to align the imaging line of the line camera with a position on a second strip of the sample holder.

When the sample holder is loaded, the autofocus system may set an initial focal plane, before the sample holder is moved.

As the sample holder is moved (for example, to be imaged) the autofocus system may monitor the focal plane, and may adjust the focal plane as necessary. Thus, "determining (for example, monitoring) a focal plane using an autofocus system as the sample holder is moved in the first direction; [and] in response to a signal from the autofocus system, moving an objective lens along an optical axis to adjust the focal plane (if necessary)" refers to this monitoring of the focal plane, and adjustment of the focal plane if necessary.

The autofocus system may set the initial focal plane at a surface of the sample holder, and as the sample holder is moved (for example, to be imaged) the autofocus system may monitor the location of the surface of the sample holder, and may compensate for any deviations in that surface by adjusting the focal plane. If the surface of the sample holder were completely optically flat (and perfectly perpendicular to the optical axis), no adjustment of the focal plane would be required.

The sample holder may comprise one or a plurality of sample chambers, and the autofocus system may set the initial focal plane at the bottom surface of the sample chamber(s) in the sample holder. As the sample holder is moved (for example, to be imaged) the autofocus system may monitor the location of the bottom surface of the sample chamber(s) in the sample holder, and may compensate for any deviations in that surface by adjusting the focal plane. If the bottom surface of the sample chamber(s) in the sample holder were completely optically flat (and perfectly perpendicular to the optical axis), no adjustment of the focal plane would be required.

Thus, the autofocus system advantageously may be a tracking autofocus system, such that the autofocus system adjusts the focal plane as the sample holder moves, optionally with a response time sufficiently fast to account for any unevenness in a surface of the sample holder, and in particular for any unevenness in the bottom surface of the sample chamber(s) in the sample holder.

The focal plane of the line camera may be set at the same plane as the focal plane determined by the autofocus system. Alternatively, the line camera may be mounted with a slight offset in the direction of the optical axis in order to place the focal plane of the line camera at a slightly different level than the focal plane for the autofocus system.

A "strip" is simply the area imaged by the line camera as the sample holder moves with respect to the imaging line. The strip may have a width which is defined by the used length W of the imaging line of the line camera (the entire length of the line camera may not be used, depending on the image size produced by the optical system), divided by the system magnification M, i.e. W/M. Put another way, the strip may have a width that is defined by the image size produced by the optical system divided by the system magnification M. The strip may have another dimension which is defined by the path which the imaging line takes over the sample holder, as a result of movement of the sample holder, in one continuous motion of the sample holder. So for example, if the sample holder moves a distance d in a straight line (a linear translational movement) the "strip" is a thin rectangular area with width W/M and length d. If the sample holder moves in a rotational motion (for example a full rotation of 360°) then the "strip" is an annulus with a width (i.e. the difference between the outer radius of the annulus and the inner radius of the annulus) of W/M.

The optical system may comprise the objective lens and a tube lens.

The optical axis along which the objective lens is moved may be perpendicular to a plane defined by a plane of the sample holder, and for example may be substantially vertical. The objective lens may be moved substantially vertically upwardly or downwardly. The support may be configured to hold the sample holder horizontally, i.e. such that the main planes of the sample holder (its top and bottom surfaces) are horizontal when the sample holder is held by the support.

Optionally, the line camera images the sample holder from below the sample holder.

In some embodiments, the first and second strips follow radial lines. In that case, the image of the first strip may be captured by linearly translating the sample holder across the imaging line of the line camera. That is, the first direction may be a straight line, corresponding to movement inwardly or outwardly along a radial line of the sample holder. The imaging line of the line camera may be aligned with the position on the second strip of the sample holder by rotating the sample holder. The second direction may be a rotational direction, e.g. clockwise or anticlockwise, about a vertical axis of the sample holder.

In some embodiments, the first and second strips follow coaxial circles having different radii (i.e. the first and second strips follow at least part of the circumference of a circle). In that case, the image of the first strip may be captured by rotating the sample holder to move the first strip across the imaging line of the line camera. That is, the first direction may be a rotational direction, e.g. clockwise or anticlockwise, about a vertical axis of the sample holder. The imaging line of the line camera may be aligned with a position on the second strip of the sample holder by linearly translating the sample holder. That is, the second direction may be a straight line, corresponding to movement inwardly or outwardly along a radial line of the sample holder.

In some embodiments, the first and second strips are parallel. In that case, the image of the first strip may be captured by linearly translating the sample holder in a first direction across the imaging line of the line camera. That is, the first direction may be a straight line. The imaging line of the line camera may be aligned with the second strip of the sample holder by linearly translating the sample holder in a direction at an angle to the first direction, for example perpendicular to the first direction. That is, the second direction may be a straight line at an angle to (for example, perpendicular to) the first direction.

The radial line, coaxial circle or parallel lines which the strips follow may be thought of as the loci of the centre of the imaging line of the line camera (i.e. the path traced out by the centre of the imaging line of the line camera).

In any of the foregoing embodiments (where the first and second strips follow radial lines, coaxial circles, or parallel lines), the sample holder optionally is circular in shape. In the cases that the first and second strips follow radial lines or coaxial circles, the radial lines may be radii of the sample holder, and the coaxial circles may be concentric with the circumference of the sample holder.

Alternatively, the sample holder may have a non-circular shape—for example, the sample holder may be square or rectangular, or otherwise polygonal. The "radial" lines in a sample holder having non-circular geometry are not then radii of the sample holder, but radii of a notional circle on the sample holder.

In each of the foregoing embodiments, wherein the sample holder may be circular in shape, or may have a non-circular shape, and where the first and second strips follow radial lines, or follow coaxial circles, or follow parallel lines, the sample holder may comprise a single sample chamber, or a plurality of sample chambers.

Where the sample holder comprises a plurality of sample chambers, a first plurality of sample chambers may be distributed along the first strip, and a second plurality of sample chambers may be distributed along the second strip. In an alternative, a single sample chamber only may be located along one of the first or second strips, and a plurality of sample chambers may be distributed along the other of the second or first strip. In another alternative, a single sample chamber only may be located along the first strip, and a single sample chamber only may be located along the second strip.

Where a plurality of sample chambers are distributed along a strip or strips of the sample holder, in some embodiments, the plurality of sample chambers distributed along a strip of the sample holder are all aligned, so that the radial line, circle, or parallel line which the strip follows passes through the centre (or a corresponding location) of each sample chamber. In some embodiments, the sample chambers generally follow the radial line, coaxial circle, or parallel line, but are not all aligned with each other. The sample chambers may for example be shifted relative to one another, for example in an alternating staggered configuration. For example, the centre of some or all of the sample chambers may be offset from the radial line, coaxial circle or parallel line along which they are distributed. For example, a first sample chamber on a radial line, coaxial circle, or parallel line may be shifted to one side of the line, and a neighbouring, second, sample chamber on the line may be shifted to the opposite side of the line. The next sample chamber may then be aligned with the first, and the next may be aligned with the second, etc.

The sample holder may be imaged along a plurality of further strips, in addition to the first and second strips. These further strips may be imaged in the same manner as the first and second strips are imaged. The strips may have the same pattern of sample chambers along each, or there may be different patterns along each, for example, half of the strips may have a first pattern of sample chambers, and half of the strips may have a different pattern of sample chambers, or each strip may have a different pattern of sample chambers.

The second strip may overlap the first strip, or the first and second strips may be spatially separated.

According to a second aspect, the present invention provides a method for performing microscopy-based imaging of samples comprising:

loading a sample holder onto a support configured to receive the sample holder, wherein the sample holder comprises a circular disc with multiple sample chambers located along each of a plurality of radial lines of the disc;

linearly translating the sample holder, to move the sample holder relative to an imaging line of a line camera, to capture an image of a first plurality of sample chambers distributed along a first radial line;

determining (for example, monitoring) a focal plane using an autofocus system as the sample holder is linearly translated;

in response to a signal from the autofocus system, moving an objective lens along an optical axis to adjust the focal plane (if necessary); and rotating the sample holder, to align the imaging line of the line camera with a position on a second radial line, along which is distributed a second plurality of sample chambers.

The autofocus system may set an initial focal plane at the bottom surface of the sample chamber in the sample holder (i.e. the focal plane may be set at the bottom surface of the sample chamber at the imaging position). As the sample holder is moved to be imaged, the autofocus system may monitor the location of the bottom surface of the sample chambers in the sample holder, and may compensate for any deviations in that surface by adjusting the focal plane. If the bottom surface of the sample chambers in the sample holder were completely optically flat (and perfectly perpendicular to the optical axis), no adjustment of the focal plane would be required.

Thus, the autofocus system advantageously may be a tracking autofocus system, such that the autofocus system adjusts the focal plane as the sample holder moves, optionally with a response time sufficiently fast to account for any unevenness in the bottom surface of the sample chambers in the sample holder.

The focal plane of the line camera may be set at the same plane as the focal plane determined by the autofocus system. Alternatively, the line camera may be mounted with a slight offset in the direction of the optical axis in order to place the focal plane of the line camera at a slightly different level than the focal plane for the autofocus system.

Optionally, the objective lens is moved along an optical axis that is perpendicular to a plane defined by a plane of the sample holder. For example, the optical axis may be vertical and the objective lens may be moved substantially vertically upwardly or downwardly. The support may be configured to hold the sample holder horizontally, i.e. such that the main planes of the sample holder (its top and bottom surfaces) are horizontal when the sample holder is held by the support.

Optionally, the line camera images the sample holder from below the sample holder.

According to a third aspect, the present invention provides an imaging device for microscopy-based imaging of samples comprising:

a line camera;

a support, configured to receive a sample holder;

an objective lens received by a lens holder, wherein the lens holder is operable to move the objective lens along an optical axis;

and an autofocus system, wherein the support is configured to move the sample holder in a first direction relative to an imaging line of the line camera to capture an image of a first strip of the sample holder, and wherein the autofocus system is configured to determine a focal plane, and is configured to output a signal which causes the lens holder to translate the objective lens in order to adjust the focal plane as necessary, during movement of the sample holder in the first direction by the support, and wherein the support is configured to move the sample holder in a second direction to align the imaging line of the line camera with a position on a second strip of the sample holder.

Optionally, the optical axis along which the objective lens is moved is perpendicular to a plane defined by a plane of the sample holder. For example, the optical axis may be vertical, and the objective lens may be moved substantially vertically upwardly or downwardly. The support may be configured to hold the sample holder horizontally, i.e. such that the main planes of the sample holder (its top and bottom surfaces) are horizontal when the sample holder is held by the support.

The imaging device may comprise an optical system comprising the objective lens and a tube lens.

Optionally, the line camera images the sample holder from below the sample holder.

As noted above, the autofocus system is configured to determine a focal plane, and is configured to output a signal which causes the lens holder to translate the objective lens in order to adjust the focal plane, as necessary. Optionally, the autofocus system is configured to find the plane of the bottom surface of a sample chamber or a plurality of sample chambers of the sample holder.

The autofocus system may be configured to set an initial focal plane at the bottom surface of the sample chamber in the sample holder (i.e. the focal plane may be set at the bottom surface of the sample chamber at the imaging position). The autofocus system may be configured to monitor the location of the bottom surface of the sample chamber(s) in the sample holder as the sample holder is moved (for example, to perform imaging), and may be configured to compensate for any deviations in that surface by outputting a signal for adjusting the focal plane. If the bottom surface of the sample chamber(s) in the sample holder were completely optically flat (and perfectly perpendicular to the optical axis), no adjustment of the focal plane would be required.

Thus, the autofocus system advantageously may be a tracking autofocus system, such that the autofocus system is configured to output a signal for adjusting the focal plane as the sample holder moves, optionally with a response time sufficiently fast to account for any unevenness in a surface of the sample holder, and in particular for any unevenness in the bottom surface of the sample chamber(s) in the sample holder.

The focal plane of the line camera may be set at the same plane as the focal plane determined by the autofocus system. Alternatively, the line camera may be mounted with a slight offset in the direction of the optical axis in order to place the focal plane of the line camera at a slightly different level than the focal plane for the autofocus system.

In some embodiments, the first direction is a straight line (corresponding to movement inwardly or outwardly along a radial line of the sample holder), and the second direction is a rotational direction (for example, clockwise or anti-clockwise, about a vertical axis of the sample holder). A device configured in this way is particularly suitable for receiving a sample holder having sample chambers distributed along a plurality of radial lines (i.e. the first and second strips follow radial lines), for example, a single sample chamber along each radial line, or a plurality of sample chambers along each radial line. Alternatively, the device is suitable for receiving a sample holder having a single sample chamber.

In other embodiments, the first direction is a rotational direction (for example, clockwise or anti-clockwise, about a vertical axis of the sample holder), and the second direction is a straight line (corresponding to movement inwardly or outwardly along a radial line of the sample holder). A device configured in this way is particularly suitable for receiving a sample holder having sample chambers distributed along a plurality of coaxial circles, for example, a single sample chamber along each coaxial circle, or a plurality of sample chambers along each coaxial circle. Alternatively, the device is suitable for receiving a sample holder having a single sample chamber.

In further embodiments, the first direction is a straight line in a first direction and the second direction is a straight line in a direction at an angle to the first direction, for example perpendicular to the first direction. A device configured in this way is particularly suitable for receiving a sample holder having sample chambers distributed along a plurality of parallel lines (i.e. the first and second strips follow parallel lines), for example, a single sample chamber along each parallel line, or a plurality of sample chambers along each parallel line. Alternatively, the device is suitable for receiving a sample holder having a single sample chamber.

The support may be configured to receive a circular sample holder, or a non-circular sample holder (for example, a square or rectangular sample holder).

The invention further extends to a system for microscopy-based imaging of samples comprising the imaging device according to the third aspect of the invention, including any or all of the optional/preferred/advantageous features discussed herein, and a sample holder, wherein the sample holder may include any or all of the optional/preferred/advantageous features discussed above in respect of the sample holder in the preceding aspects, and/or any or all of the optional/preferred/advantageous features discussed below.

In a particularly advantageous embodiment, the sample holder comprises a plurality of sample chambers located along each of a plurality of radial lines of the holder.

According to a fourth aspect, the present invention provides an imaging device for microscopy-based imaging of samples comprising:

a line camera;

a support, configured to receive a sample holder;

an objective lens received by a lens holder, wherein the lens holder is operable to translate the objective lens along an axis perpendicular to a plane of the support which receives the sample holder; and an autofocus system, wherein the support is configured to translate a received sample holder to move the sample holder relative to the imaging line of the line camera, such that a first radial line of the sample holder can be imaged by the line camera, and is configured to rotate the received sample holder, such that a second radial line of the sample holder can be imaged by the line camera, on subsequent translation of the sample holder, and wherein the autofocus system is configured to determine a focal plane, and is configured to output a signal which causes the lens holder to translate the objective lens in order to adjust the focal plane, during translation of the sample holder by the support.

The autofocus system may be configured to set the initial focal plane at the bottom surface of a sample chamber or a plurality of sample chambers(s) in the sample holder. The autofocus system may be configured to monitor the location of the bottom surface of the sample chamber(s) in the sample holder as the sample holder is moved (for example, to perform imaging), and may be configured to compensate for any deviations in that surface by outputting a signal for adjusting the focal plane. If the bottom surface of the sample chamber(s) in the sample holder were completely optically flat (and perfectly perpendicular to the optical axis), no adjustment of the focal plane would be required.

Thus, the autofocus system advantageously may be a tracking autofocus system, such that the autofocus system is configured to output a signal for adjusting the focal plane as the sample holder moves, optionally with a response time sufficiently fast to account for any unevenness in a surface of the sample holder, and in particular for any unevenness in the bottom surface of the sample chamber(s) in the sample holder.

The focal plane of the line camera may be set at the same plane as the focal plane determined by the autofocus system. Alternatively, the line camera may be mounted with a slight offset in the direction of the optical axis in order to place the focal plane of the line camera at a slightly different level than the focal plane for the autofocus system.

Optionally, the optical axis along which the objective lens is translated is generally vertical and the lens holder is configured to move the objective lens substantially vertically upwardly or downwardly. The support may be configured to hold the sample holder horizontally, i.e. such that the main planes of the sample holder (its top and bottom surfaces) are horizontal when the sample holder is held by the support.

Optionally, the line camera images the sample holder from below the sample holder.

The invention further extends to a system for microscopy-based imaging of samples comprising the imaging device according to the fourth aspect of the invention, including any or all of the optional/preferred/advantageous features discussed herein, and a sample holder, wherein the sample holder may include any or all of the optional/preferred/advantageous features discussed below.

In a particularly advantageous embodiment, the sample holder has a circular shape with one or multiple sample chambers located along each of a plurality of radial lines of the sample holder.

Embodiments of the invention allow for rapid imaging. Rapid imaging is achieved in part due to the use of a line camera, rather than an area camera. The use of a line camera enables fast imaging because the sample holder is constantly moving to capture images along each strip. This means that there is no start-stop motion (except at either end of each strip). If an area camera were to be used instead of a line camera, the sample holder would need to be stationary whilst each image is taken, which would lead to a much greater degree of start-stop motion. Start-stop motion is undesirable because the system must be allowed to settle down after each start and stop. Rapid imaging is advantageous as it allows for imaging of a large area in a relatively short time period.

Advantageously, the line camera does not move. This is advantageous as the line camera is then not subject to mechanical vibrations, etc. caused by movement, which could impair the quality of the captured images.

As noted above, the focal plane may be adjusted by the autofocus system by moving the objective lens along an axis perpendicular to the plane of the sample holder. Moving the objective lens, rather than the sample holder or line camera, for example, avoids subjecting the sample holder or line camera to rapid, stop-start motions which would necessitate time to allow the system to settle, and hence slow down the imaging process.

A further advantage of the use of a line camera is that it is readily adaptable to changes in sample chamber geometry and spacing, i.e. for different designs of sample holder.

Though not limited to such a use, the device and method of the present invention are particularly suited to use for antimicrobial susceptibility testing (AST) analysis. In such an analysis, the growth of pathogens in a sample is determined in a number of different antimicrobial agents at a number of different concentrations. High speed imaging of a large area allows a large number of conditions (i.e. a large number of antimicrobial agents at several different concentrations) to be tested simultaneously.

The object resolution of the imaging device may be 1 μm or better (i.e. the imaging device may be able to resolve objects with dimensions of 1 μm or smaller). Such a device is capable of imaging individual pathogens, for example.

The line camera may comprise a linear digital image sensor, such as a CMOS or CCD image sensor.

The line camera may have a line length defined by the "pixel length" of each pixel multiplied by the number of pixels along the line. The line camera may have a line width defined by the "pixel width" of the pixels. Here, "pixel length" and "pixel width" are labels only; no limitation is implied on the relative sizes of these dimensions. Thus, the "pixel width" may be greater than, equal to, or smaller than the "pixel length". The "pixel length" dimension is the dimension of the pixels in the direction that they are aligned end-to-end (side-by-side) to form the line length. The "pixel width" dimension is the transverse dimension. In one embodiment the pixels are square, but this is not a requirement. The pixels may for example be rectangular.

The line camera may have a line width (i.e. pixel width) of 5 μm or less, for example, 4 μm, 3.5 μm, 3 μm, 2.5 μm, or less. The line camera may have a line width (i.e. pixel width) of 2 μm or more. For example, the line camera has a line width of between 2.5 and 3.5 μm. The values discussed here (i.e. in the range of 2 μm to 5 μm) are particularly suitable for use with a system magnification of 10× (but are not limited to use with such a system magnification); where a different system magnification is chosen, the line width may be chosen accordingly.

The selection of line width and numerical aperture is advantageously made to achieve a resolution of 1 μm.

The line camera may have a line length (i.e. pixel length× number of pixels) of 100 mm or less, for example 80 mm or less, 70 mm or less, 60 mm or less, or 50 mm or less. The line camera may have a line length (i.e. pixel length×number of pixels) of 10 mm or more, for example 20 mm or more. The line camera may have a line length of between 15 mm and 60 mm.

The line camera line length may be selected taking into consideration the size of the image which will be produced by the objective lens. Thus, for an objective lens which together with the associated tube lens produces an image having a width of around 20 mm, advantageously a line camera is selected which has a broadly similar line length (for example, between 20 mm to 30 mm, and in particular, approximately 20 mm). Alternatively, a line camera with a larger line length may be used, but only a part of this longer line length may be used to image the sample chambers. For example, a line camera with a line length of approximately 60 mm may be used, but in practice only approximately 20 mm of the line length may be utilised for imaging the sample chambers. This is the case particularly where the characteristics of the objective lens are such that it produces an image having a size which is less than the full width of the imaging camera line width.

The line camera line length is optionally longer than the magnified extent of the sample chambers in the direction perpendicular to the radial line, coaxial circle or parallel line along which the sample chambers are distributed. This allows for the entire sample chamber to be imaged, even in the event of a slight misalignment of the radial line, coaxial circle or parallel line with the imaging line of the line camera. The magnified extent is the physical extent multiplied by the magnification of the system. (The meaning of the term "extent" is discussed in further detail below in the discussion concerning the features of the sample holder.) For example, if the sample chambers have an extent (a physical extent) of 2 mm in the direction perpendicular to the radial line, coaxial circle or parallel line and the magnification is 10×, then the magnified extent is 20 mm, and the line camera line length may be greater than 20 mm, for example, 25 mm.

In other embodiments, the line camera length may be shorter than the magnified extent of the sample chambers in the direction perpendicular to their respective radial line, coaxial circle or parallel line, but in this case it will not be possible to image the entirety of each sample chamber. In such cases, the line camera length may be selected to image greater than 50% of each sample chamber, for example 60%, 70%, 80% or 90%.

The line camera imaging rate may be greater than 20 kHz, and for example is greater than 40 kHz. For example, the line camera imaging rate may be 48 kHz. A faster imaging rate allows the imaging of the sample holder to be completed more quickly. However, if the line rate is too high, such that the exposure time is very short, there may not be sufficient illumination intensity to give an adequate sensor exposure. The line camera imaging rate may be less than 200 kHz.

The line camera may image a sample in the sample chamber from below the sample holder.

As noted above, the line camera is configured to capture an image. This is advantageously an area image, constructed from a plurality of serially captured line images.

The line camera may output a series of line images (i.e. single lines of pixels) to a frame grabber which creates a composite image (i.e. the area image) from the plurality of frames. The imaging device may therefore comprise a frame grabber.

The composite image may be passed to image analysis software which may cut and truncate the composite image into relevant parts, for example, separate images for each sample chamber, and then analyse the image areas. The device may comprise a processor for running software to perform the image analysis, and digital storage for storing the software and the images.

The imaging device may comprise an illumination source, wherein the illumination source is optionally monochromatic, or a narrow-band source. By "narrow-band" source, we mean that $(\lambda_{max}-\lambda_{min})/\lambda_{center} \ll 1$, where $\lambda_{max}$ is the maximum wavelength, $\lambda_{min}$ is the minimum wavelength, and $\lambda_{center}$ is the central wavelength, of the emission peak of the illumination source. The use of such an illumination source (i.e. monochromatic, or a narrow-band source) is advantageous as in general it provides for better contrast in the images. On the other hand, the use of a white or broad-band light source would result in chromatic aberration, which would necessitate modifications to the system to minimize the effect of the chromatic aberration, which is undesirable.

The light source may comprise an incandescent lamp, an arc lamp, an LED, a laser diode, or a laser, for example. Optionally, the light source is an LED, or a plurality of LEDs.

The light from the illumination source may pass through a condenser (comprising a single lens, a compound lens, or a lens set) prior to being incident on the sample holder (when held by the support), in order to shape the light beam emitted from the light source into a shape suitable for illuminating the sample chamber in the sample holder which is at the imaging position. The shape of the light beam may be chosen taking into consideration the geometry of the sample chambers in the sample holder. The illumination source and the condenser (where one is provided) should produce as even illumination as possible over the bottom surface of the sample chamber at the imaging position, and particularly should produce even illumination at the imaging line position (i.e. the position at which the imaging line images the sample holder).

Advantageously, the illumination homogeneity over an imaged line is 80 to 100% of the maximum illumination. Advantageously, the illumination intensity is within ±10% of the mean intensity over the imaging line. Such illumination homogeneity is advantageous only over the line that is imaged; the illumination may be less homogenous elsewhere.

The illumination wavelength may be chosen taking into consideration the nature of the samples to be imaged, and/or the design capabilities of the optical components in the system. In one example, the illumination wavelength is between 500 and 600 nm, and optionally is in the range of 525 to 575 nm. Advantageously, the illumination wavelength is about 550 nm. Where the illumination source is a narrow-band source (rather than a monochromatic source), these values may be applicable to the central wavelength of the source. Such illumination wavelengths are advantageous as the design wavelengths for commercial off-the-shelf optics are usually in this range (i.e. the optics are best corrected for these wavelength ranges).

The illumination source may comprise a filter configured to pass only a selected wavelength range of the light emitted by the illumination source. Such a filter is not necessary if the illumination source is monochromatic, but may be useful if the illumination source emits a spread of wavelengths. For example, the filter may be a narrowband single band bandpass filter, with the central wavelength of the band at approximately the central wavelength of the illumination source. The bandwidth of the bandpass filter may be less than 200 nm, and may be approximately 100 nm, or less. The bandpass filter may be placed right after the condenser, or between optical elements in the condenser, so as to place the filter in a space with minimum divergence of the rays.

The illumination source may illuminate the sample holder (when held by the support) from above. That is, the illumination source may be provided at a position above the support.

The illumination source may comprise a plurality of light sources, and/or a diffuser may be positioned between the illumination source and the sample holder, for example between a/the condenser and the sample holder. Such embodiments are particularly advantageous where part of the sample holder (for example, an upper part of the sample holder such as a lid) is optically active and has the effect of causing non-uniformity in the light incident onto the sample chambers. The optically active layer may comprise structures that refract or block light so that the illumination intensity as perceived over the imaged areas in the focal plane is not even, but shows variations dependent on the shape of the layer above. Such variations may be detrimental to the image and subsequent image processing. In such a case, the diffuser or plurality of light sources may act to provide a more even (i.e. more homogeneous) illumination to the sample chambers. Where a plurality of light sources is provided, these may be positioned to provide different path lengths for illumination of the sample chambers. Where a diffuser is provided, the diffuser may be an optical diffuser which diffuses the light evenly, or it may be an engineered diffuser comprising an engineered surface having structures designed to cancel out the light intensity variations caused by the optically active part of the sample holder.

The autofocus system may comprise an autofocus system light source, wherein the autofocus light source is an additional light source that is different from the illumination source. The autofocus system light source may be a laser.

Optionally, the imaging device comprises a dichroic mirror. The above-mentioned bandpass filter may also not be necessary where the dichroic mirror is correctly tuned to provide the proper spectral characteristics for the illumination light.

Optionally, the dichroic mirror is broadly transparent to light from the illumination source but reflects the light from the autofocus system light source, or is transparent to light from the autofocus system light source but broadly reflects the light from the illumination source.

The wavelength of the autofocus system light source may differ from the wavelength of the illumination source. Otherwise, the dichroic mirror will not separate the light from the two different sources, in which case the function of the autofocus unit may be impaired (for example, as a result of imaging light entering the autofocus unit), and/or light from the autofocus system may be detected by the line camera, which may be detrimental to imaging.

The light from the autofocus system light source may be configured to pass through the objective lens, to be incident onto a bottom surface of the sample holder.

The autofocus system advantageously may be a tracking autofocus system, such that the autofocus system adjusts the focal plane as the sample holder moves, optionally with a response time sufficiently fast to account for any unevenness in the sample holder, and in particular for any unevenness in the bottom surface of the sample chambers in the sample holder.

An initial focal plane may be determined by the autofocus system when the sample holder is loaded into the device, and then the focal plane is adjusted as the sample holder is moved during imaging. Thus, when the sample holder is loaded into the device, the system is likely out of focus and the autofocus system may perform a search for a surface, and may find and lock the focal plane to the surface. During imaging (as the sample holder is moved) the autofocus system may monitor the location of the surface, and may compensate for any deviations by adjusting the focal plane.

The autofocus system may be configured to set the focal plane at the bottom surface of the sample chambers in the sample holder, and/or to follow this surface during imaging.

The focal plane of the line camera may be set at the same plane as the focal plane determined by the autofocus system. Alternatively, the line camera may be mounted with a slight offset (for example, greater than 0 mm and less than 20 mm, optionally by 15 mm, 10 mm, 5 mm, 2 mm or 1 mm) in the direction of the optical axis in order to place the focal plane of the line camera at a slightly different level than the focal plane for the autofocus system. This may improve imaging of the microscopic objects in the sample chambers.

Optionally, the autofocus system is configured to adjust the focal position at least every 1 ms, for example every 0.5 ms, every 0.25 ms, every 0.15 ms, or every 0.1 ms.

Pairing a line camera with an autofocus system that can react fast enough to move the focal position according to unevenness of the sample holder (in particular, unevenness of the bottom surface of the sample chambers in the sample holder) also leads to more accurate focussing, since only a single line needs to be in focus at a time. In contrast, for an area image, unless the sample holder is completely optically flat, parts of the imaged area will be out of focus. With a line camera, a new focus position can be set for each fine, if the autofocus system can respond quickly enough compared to the line camera line rate. In practice, the autofocus system may re-check (and adjust, if necessary) the position of the focal plane every 5 to 10 lines, for example. To image a single sample chamber, the line camera may capture thousands of lines (for example, between 10,000 and 15,000), and so the focal plane may be adjusted hundreds or thousands of times, across each sample chamber.

As noted above, the autofocus system is configured to output a signal which causes the lens holder to translate the objective lens in order to adjust the focal plane. The lens holder may be able to translate the objective lens along an axis perpendicular to a plane of the support which receives the sample holder, with a precision of 1 µm or better. Movement of the lens holder may be driven by a linear actuator.

In one configuration, light from the autofocus system light source may pass through the dichroic mirror (for example, to pass through the objective lens and to be incident onto the bottom surface of the sample holder), whereas light from the sample holder that has passed through the objective lens may be reflected by the dichroic mirror towards the line camera.

In an alternative configuration, light from the autofocus system light source is reflected by the dichroic mirror (for example, to pass through the objective lens and to be incident onto the bottom surface of the sample holder), whereas light from the sample holder that has passed through the objective lens may pass through the dichroic mirror towards the line camera.

As noted above, the support is configured to receive the sample holder. Thus, for example, the support may comprise a platform comprising a recessed region shaped to conform to the outer dimensions of the sample holder, such that, when placed within the recess, the sample holder cannot move laterally.

The platform may be provided on linear tracks attached to the support, and a motor may be provided to drive the platform in either direction along the tracks. The motor may drive movement of the platform along the tracks via a rack and pinion arrangement, for example.

The support may comprise a through-hole, below the plane at which the sample holder is supported, which allows a portion of the sample holder to be imaged by the line camera, from below.

As further noted above, the support is configured to move a received sample holder relative to the imaging line of the line camera, such that a first strip of the sample holder can be imaged by the line camera, and is configured to move the received sample holder, for example such that a second strip of the sample holder can be imaged by the line camera, on subsequent movement of the sample holder.

The form of the movements of the support may be chosen taking into consideration the layout of the sample chambers on the sample holder.

For example, the sample chambers may broadly follow radial lines on the sample holder. Then, in an advantageous example, the support may be configured to translate the received sample holder linearly in a first direction (for example, from a radially outward position towards the centre of the sample holder), then to rotate the received sample holder in a second direction (e.g. in a clockwise or anticlockwise direction, about a vertical axis of the sample holder), then to translate the received sample holder linearly again in a third direction, the third direction being the opposite direction to the first direction (for example, from a position towards the centre of the sample holder towards a radially outward position), and then to rotate the received sample holder again (in the same clockwise or anticlockwise direction). Imaging of the sample chambers may be carried out as the sample holder is translated in the first direction (for a first radial line of sample holders) and as the sample holder is translated in the third direction (for a second radial line of sample holders). These steps may be repeated, such that each of the plurality of radial lines of sample chambers on the sample holder is imaged.

In an alternative less advantageous example, the support may be configured to translate the received sample holder linearly in a first direction (for example, from a radially outward position towards the centre of the sample holder), then to translate the received sample holder linearly again in a second direction, the second direction being the opposite direction to the first direction (for example, from a position near the centre of the sample holder towards a radially outward position), then to rotate the received sample holder (e.g. in a clockwise or anticlockwise direction). Imaging of the sample chambers may be carried out as the sample holder is translated in the first direction only. These steps may be repeated, such that each of the plurality of radial lines of sample chambers on the sample holder is imaged. This embodiment is less advantageous as the time taken to image the sample holder is roughly double that taken in the advantageous embodiment described above.

The sample chambers may broadly follow coaxial circles on the sample holder (i.e. the sample chambers lie along coaxial circles, each coaxial circle having a different radius). Then, the support may be configured to rotate the received sample holder (e.g. in a clockwise or anticlockwise direction, about a vertical axis of the sample holder), then to translate the received sample holder linearly (for example, from a radially outward position towards the centre of the sample holder), then to rotate the received sample holder again. This second rotation may be in the same direction or the opposite direction to the first rotation. Imaging of the sample chambers is carried out as the sample holder is rotated. These steps of rotating and linearly translating may be repeated, such that each of the plurality of coaxial circles of sample chambers on the sample holder is imaged.

The sample chambers may broadly follow parallel lines on the sample holder. Then, the support may be configured to linearly translate the received sample holder in a first direction, then to translate the received sample holder linearly in a second direction at an angle to the first (for example, perpendicular to the first), then to linearly translate the received sample holder in a third direction, opposite to the first direction. Imaging of the sample chambers may be carried out as the sample holder is translated in the first and third direction. These steps of linearly translating may be repeated, such that each of the plurality of parallel lines of sample chambers on the sample holder is imaged.

The support may be configured such that it holds the sample holder in a fixed position with respect to the vertical axis, i.e. such that the sample holder does not move upwardly or downwardly. The support may be configured to hold the sample holder horizontally, i.e. such that the main planes of the sample holder (its top and bottom surfaces) are horizontal.

The support may comprise a platform lid which is hingedly connected to the platform. When the platform is translated to an extreme position at one end of the linear tracks, the platform lid may be configured to pivot upwardly about the hinged connection, enabling the sample holder to be received by the recessed region. When the platform is moved from this extreme position, the platform lid may be configured to pivot downwardly about the hinged connection, to securely hold the sample holder.

The sample holder may be loaded onto the support (i.e. into the recessed region of the platform) at the extreme position. In this position, the sample holder may rest on the recessed region and be prevented from lateral movement by the recessed region. Optionally, as the platform moves from the extreme position, the sample holder is further held by the platform lid, such that the sample holder is prevented from movement upwardly or downwardly by the downward force applied by the platform lid. Movement of the platform lid may be caused by engagement of the platform lid with a guide rail, which guides the platform lid upwardly and downwardly, as necessary.

The support may be configured to move the sample holder a distance of between 30 mm and 130 mm, for example 40 mm and 100 mm, for example 50 mm to 70 mm, in each linear translation.

The support may be configured to translate the sample holder linearly at a speed of 10 to 20 mm/s, for example 15 mm/s to 18 mm/s. Optionally, the speed of the linear movement may fluctuate to a maximum of ±5% during imaging.

The speed of linear movement of the sample holder may be selected to give an undistorted image, i.e. the speed of linear movement of the sample holder is set taking into consideration the camera imaging rate, the width of the pixel in the line camera imaging line, and the magnification provided by the optical system (comprising the objective lens and tube lens).

In particular, the speed s of the linear movement of the sample holder is given by:

$$s = \frac{\text{pixel width} \times \text{line camera imaging rate}}{\text{magnification}}$$

This leads to an undistorted image. Changing the speed and/or camera pixel size and/or pixel aspect ratio and/or system magnification and/or exposure time may distort the image. In some embodiments, a systematic distortion of the image may be acceptable. For example, if the speed of the linear movement of the sample holder is smaller than s, then microscopic objects in the image will be systematically elongated. If the speed of the linear movement of the sample holder is greater than s, then microscopic objects in the image will be systematically contracted. Subsequent image processing may reverse this effect, or may otherwise take into account this effect.

The support may comprise a drive wheel configured to rotate the sample holder (for example, about a vertical axis of the sample holder). For example, the drive wheel may be located adjacent to the rim of the sample holder, to frictionally engage the rim of the sample holder. In some embodiments, the drive wheel is pressed to the rim using a spring action. The drive wheel is optionally driven by a second motor, via a drive belt. The support therefore may comprise a second motor and drive belt. The drive wheel may be configured to disengage from the rim of the sample holder when the platform is translated to an extreme position at one end of the linear tracks. The drive wheel may be configured to engage with the rim of the sample holder when the platform is translated away from the extreme position.

The support may be configured to rotate the sample holder (for example using the drive wheel) at a speed of approximately 30° per second.

The support may be configured to align the sample holder in a specific position such that the starting position for the imaging of the first strip is known. Optionally, the support comprises a dedicated detector (for example, a photodetector) configured to detect a single alignment structure which is present on the sample holder at a distance from the centre of the sample holder where no other structures are present. This alignment structure defines the absolute position, and then a predetermined offset gives the rotational position of the starting imaging position. For example, the device may find the starting position for the imaging to within ±500 µm, or within ±100 µm, or even within ±50 µm, as measured at the outermost sample chamber.

Optionally, a fine positioning procedure is carried out. The procedure comprises: positioning the imaging line in the outermost sample chamber of the first radial line; imaging the outermost sample chamber; carrying out image analysis (for example, comprising edge analysis to find the edges of the sample chamber); and rotating the sample holder until the midpoint of the imaged outermost sample chamber is positioned on the optical axis. This sets the starting position for the imaging to within ±50 µm, as measured at the outermost sample chamber.

The optical system (which for example comprises the objective lens and tube lens) may provide a magnification of between 10× and 100×, for example, and optionally provides a magnification of 10×.

The tube lens may focus the collimated beam coming out of the objective lens onto the line camera.

The device may be configured to image the or each sample chamber at a plurality of time points. In an AST analysis, for example, the presence or absence, and/or amount of growth of the pathogen in the sample chamber may be determined at each time point.

The sample holder may comprise focus-verification structures to check whether an image captured by the line camera is in focus.

The sample holder may include the samples. The samples may include microscopic objects contained in a sample fluid, such as the microscopic objects discussed below. The fluid may be a liquid with the microscopic objects in suspension or present on the surfaces of the sample chamber the sample is contained within. The sample fluid may include clinical samples or material derived from clinical samples, wherein the clinical samples include, but are not limited to, blood, serum, plasma, blood fractions, joint fluid, urine, semen, saliva, faeces, cerebrospinal fluid, gastric contents, vaginal secretions, mucus, a tissue biopsy sample, tissue homogenates, bone marrow aspirates, bone homogenates, sputum, aspirates, wound exudate, swabs and swab rinsates e.g. a nasopharyngeal swab, other bodily fluids and the like. The sample fluid may include a culture medium and could be a mixture of clinical samples or material derived from clinical samples with culture medium.

The microscopic objects may include particles (particularly bio-particles), cells (for example mammalian cells such as human cells), micro-organisms such as bacteria, other pathogens such as viruses and fungal pathogens and/or molecules including macromolecules. The microscopic objects can include any object that is suitably sized (for example, having dimensions of less than 500 µm, less than 100 µm, less than 50 µm, less than 20 µm, less than 10 µm or less than 1 µm) and can be detected based on imaging methods, including potentially the use of fluorescence of the object or of a fluorescent composition applied to the object. In some examples, if the objects are translucent objects without scattering properties, such as RCP (Rolling Circle Products), the objects may be 10 µm or less in size, perhaps 5 µm in size or smaller. Such objects may have a largest dimension of 2 µm or less, perhaps 1.5 µm or less, 1 µm or less and in some cases 0.5 µm or less.

As noted above, the samples may include microscopic objects contained in a sample fluid. In an AST analysis, the microscopic objects may include pathogens (for example, bacteria, viruses or fungal pathogens). In such a case, the pathogens may be present in a sample fluid such as a microbiological growth medium (for example, cation-adjusted Mueller-Hinton broth (CAMHB)), for performing a broth microdilution assay. The sample chambers may comprise a plurality of antimicrobial agents at a plurality of concentrations.

As also noted above, the samples may include microscopic objects in suspension or present on the surfaces of the sample chamber the sample is contained within. In some embodiments, substantially all the microscopic objects are in suspension. In other embodiments, most of the microscopic objects are in suspension and the remainder are present on the surfaces of the sample chamber (for example, the bottom surface of the sample chamber). In still other embodiments, most of the microscopic objects are present on the surfaces of the sample chamber (for example, the bottom surface of the sample chamber) and the remainder are in suspension. In other embodiments, substantially all the microscopic objects are present on the surfaces of the sample chamber (for example, the bottom surface of the sample chamber). The microscopic objects may initially be in suspension, but may move over time (for example, by passive diffusion or under gravity, or using locomotive means such as flagella, in the case of some pathogens) to reach surfaces of the sample chamber (for example, the bottom surface of the sample chamber), and may attach to those surfaces. Though the sample chambers may be imaged at the bottom surface of the sample chamber (or just above this surface), in some embodiments, no active steps are taken to get the microscopic objects to that surface, or to keep them there. That is, the system optionally comprises no means for actively getting the microscopic objects to a surface of the sample chamber (for example, the bottom surface of the sample chamber), or keeping them at the surface. Alternatively, active steps are taken to get the microscopic objects to that surface, or to keep them there. That is, the system may comprise means for actively getting the microscopic objects to a surface of the sample chamber (for example, the bottom surface of the sample chamber), or keeping them at the surface. For example, the system comprises agar/agarose at the surface, ligands at the surface, a means for flowing fluid to get the microscopic objects to a surface of the sample chamber (or keep them there) or means for performing electrophoresis, centrifugation, filtration or dielectrophoresis to get the microscopic objects to a surface of the sample chamber (or keep them there).

In some example embodiments the sample holder is a consumable single-use product that can be disposed of after use. This allows for repeated use of the same imaging device without the need for cleaning of the sample holder, and minimises the risk of contamination of samples.

Optionally, the sample holder is broadly the same shape and size as a standard compact disk (CD). The sample holder may be manufactured using standard techniques to make a CD.

In one exemplary sample holder, the sample holder comprises between 1 and 600 sample chambers, for example, 50 to 500 sample chambers, and in some examples, 80 to 400 sample chambers, for example 96 chambers, 336 chambers or 384 chambers.

In examples having sample chambers following radial lines, there may be 12 radial lines of sample chambers, with 8 sample chambers along each radial line, or 16 radial lines of sample holders, with 6 sample chambers along each radial line, or 24 radial lines of sample holders, with 4 sample chambers along each radial line. Each of the foregoing examples comprises 96 sample chambers, but there may be more or fewer sample chambers. In other examples, there may be 48 radial lines of sample chambers, with 8 sample chambers along each radial line, or 64 radial lines of sample holders, with 6 sample chambers along each radial line, or 94 radial lines of sample holders, with 4 sample chambers along each radial line. Each of the foregoing examples comprises 384 sample chambers.

In other configurations, the number of sample chambers along each radial line may not be the same for all radial lines of the sample chamber. For example, radial lines of 6 sample chambers and 8 sample chambers may alternate. In one example, there may be 48 radial lines of sample chambers, with alternating lines of 8 sample chambers and 6 sample chambers.

In examples having sample chambers following coaxial circles (each circle lying at a different radius), there may be the same number of sample chambers on each coaxial circle (for example, there may be 8 coaxial circles with 12 sample chambers on each line), but more likely, there will be a different number of sample chambers on each coaxial circle (for example, an inner coaxial circle may have 4 sample chambers, the next may have 8, the next may have 12, the next may have 16, the next may have 24 and the outermost may have 32).

In examples having sample chambers following parallel lines, there are for example 32 parallel lines each having 12 sample chambers, or 16 parallel lines each having 24 sample chambers.

Optionally, the sample chambers are broadly rectangular or square in cross-section, where the section line is taken in the horizontal plane, parallel to the main (upper and lower) surfaces of the sample holder. Put another way, the bottom surface of the sample chamber is broadly square or rectangular.

Each sample chamber has a "length" in the direction along the respective radial line, parallel line or coaxial circle, and a "width" in the direction perpendicular to that line. Here, "length" and "width" are labels only; no limitation is implied on the relative sizes of these dimensions. Thus, the width may be greater than, equal to, or smaller than the "length". In some embodiments, the sample chambers all have the same size, shape and aspect ratio (length/width). In other embodiments, one or more of these features may differ between different sample chambers.

Where a single sample chamber is provided, the sample chamber may be substantially the same size as the sample holder.

The length of the sample chamber(s) may be less than 70 mm, 60 mm, 50 mm, 30 mm, 20 mm, 10 mm, 5 mm or 3 mm. The width of the sample chamber(s) may be less than 100 mm, 50 mm, 20 mm, 10 mm, 5 mm 4 mm or 2 mm. The lengths and widths of the sample chambers may for example be 1 to 5 mm, for example, 1 to 3.5 mm, or 1.5 to 3 mm.

The sample chambers may have a depth of less than 15 mm, less than 10 mm, or less than 5 mm.

The sample chambers may be located along, or distributed along radial lines, concentric circles or parallel lines on the sample holder. In some embodiments, this means that the sample chambers are all aligned, so that the respective radial line, concentric circle or parallel line passes through the centre of each sample holder. In some embodiments, the sample chambers generally follow the radial line, concentric circle or parallel line, but are not all aligned with each other. The sample chambers may for example be shifted relative to one another, for example in an alternating staggered configuration. For example, the centre of some or all of the sample chambers may be offset from the radial line, concentric circle or parallel line along which they are distributed. For example, a first sample chamber on the radial line, concentric circle or parallel line may be shifted to one side of the radial line, concentric circle or parallel line, and a neighbouring, second, sample chamber on the radial line, concentric circle or parallel line may be shifted to the opposite side of the radial line, concentric circle or parallel line. The next sample chamber may then be aligned with the first, and the next may be aligned with the second, etc.

As noted above, the line camera line length may be longer than the magnified extent of the sample chambers in the direction perpendicular to the radial line, concentric circle or parallel line. The "extent" depends on both the width of the sample chambers, and how they are distributed along the radial line, concentric circle or parallel line, i.e. aligned with each other or staggered in some way.

Where the sample holders along one radial line (for example) have equal width W and where the sample holders are aligned (such that the radial line passes through the centre of each sample holder), the corresponding outer edges of the sample holders distributed along one radial line are collinear, and the extent of the sample chambers in the direction perpendicular to the radial line is then the width, W, of the sample chambers. Where the sample chambers are in a staggered configuration, for example where a first sample chamber is offset in one direction perpendicular to the radial line, and another sample chamber is offset in the opposite direction, if both sample chambers have width W, and the widths overlap by distance D, the extent of the sample chambers perpendicular to the radial line is 2W-D.

Similar comments apply in respect of sample chambers having staggered configurations along concentric circles or parallel lines.

Focus-checking structures (for example, pyramid-shaped or groove-shaped indentations), may be provided in the sample holder (for example, in a bottom layer of the sample holder). Such structures are described in Q-Linea AB's application PCT/EP2017/064715 (WO 2017/216314 A1). For example, the focus-checking structures may be provided in the bottom of each sample chamber, adjacent each sample chamber (i.e. spaced inwardly of the outer width of the sample chambers) or may be provided between adjacent sample chambers, spaced inwardly of the outer width of the sample chambers. The focal structures may be spaced to appear in every 10th line, every 50th line, or every 100th line, captured by the line camera.

Where the sample holder includes focus checking structures distributed adjacent at least one, a plurality of, or each, sample chamber, spaced outwardly of the outer width of the sample chambers, the line camera line length may be longer than the magnified extent of the sample chambers in the direction perpendicular to the radial line, concentric circle or parallel line, including the focus checking structures.

Where the sample holder includes focus-checking structures (as described for example in Q-Linea AB's application PCT/EP2017/064715 (WO 2017/216314 A1)), the subsequent image processing may include checking whether the images are in focus by checking whether an associated focal structure is in focus (as described for example in Q-Linea AB's application PCT/EP2017/064711 (WO 2017/216310 A1)). The images acquired by the device may be analysed using an image analysis algorithm, for example as described in Q-Linea AB's application PCT/EP2017/064713 (WO 2017/216312 A1). The invention is of course not limited to such an image analysis; any suitable image analysis method may be used.

The devices and systems described herein may be operated in accordance with the above described methods, and provide similar advantages. Thus, the device/system may be configured to carry out the method of the first or second aspects, including any of the preferred/optional/advantageous features of those methods, as described above. The various aspects of the invention may comprise any of the optional/preferred/advantageous features of the other aspects of the invention.

Whilst the embodiments discussed above have been discussed in the context of bright-field microscopy, fluorescence microscopy could be used. In that case, the microscopic objects can include any object that is suitably small in size and can be detected based on imaging methods including the use of fluorescence of the object or of a fluorescent composition applied to the object.

Moreover, whilst the invention has been described as being particularly advantageous in an AST analysis, the invention is of course much more generally applicable, for example to drug screening or cell culture analyses, also under multiple differing conditions.

Embodiments of the present invention will now be described by reference to the accompanying figures, in which.

Figure 1A:
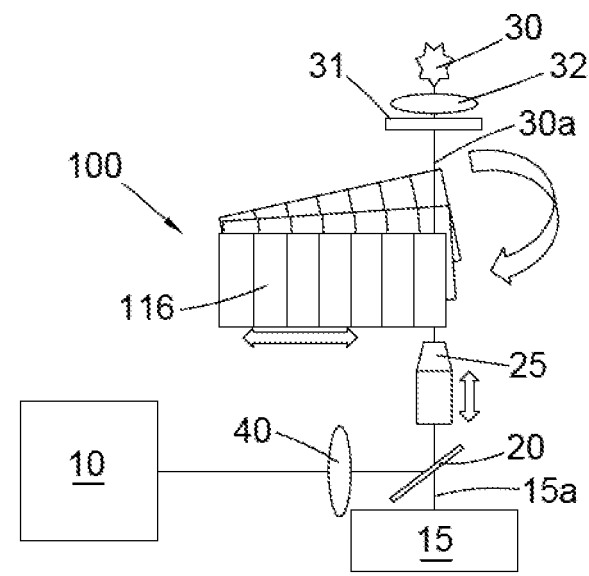
FIGS. 1A and 1B show systems for microscopy-based analysis of samples.
Figure 1B:
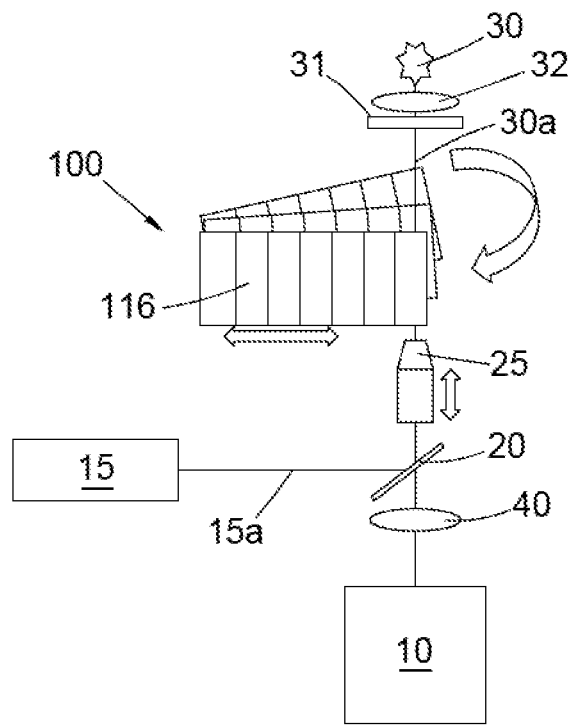

FIGS. 1A and 1B shows a system for microscopy-based analysis of samples. Each system comprises a device for microscopy-based analysis of samples comprising a line camera 10, a tracking autofocus system 15, a dichroic mirror 20, an objective lens 25, an illumination light source 30, a band-pass filter 31, a condenser 32, and a tube lens 40. The two systems in FIGS. 1A and 1B are very similar, the difference being that the locations of the line camera 10 (and tube lens 40) and autofocus system 15 are swapped.

Figure 3:
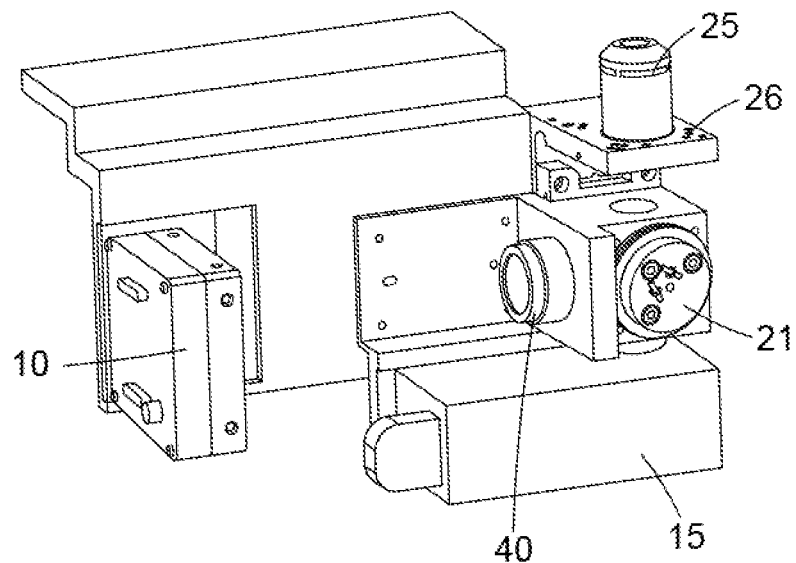
FIG. 3 shows a line camera, autofocus system, objective lens and tube lens, arranged as in the system of FIG. 1A.

In one example, the line camera 10 is a Linea LA-CM-16K05A (comprising a CMOS digital image sensor) manufactured by Teledyne DALSA, coupled with an XTIUM-CL MX4 frame grabber (not shown), also by Teledyne DALSA. The camera array size is 1×16,384 pixels, with each pixel being 3.5 µm×3.5 µm. The line width is therefore 3.5 µm, and its length is 57.7 mm. Only a portion of this length may be used, in practice (for example, fewer than half of the pixels may be used). The autofocus system 15 comprises a system from WDI WISE Device Inc., comprising the ATF6 SWIFT digital autofocus system (with laser wavelength of 785 nm) and an MCZ controller for controlling the position of the objective lens 25 in the z-direction. The objective lens 25 is a Nikon CFI Plan-fluor (10× magnification, NA 0.3). The dichroic mirror 20 is a 662 nm edge BrightLine single-edge imaging-flat dichroic beamsplitter manufactured by Semrock. The dichroic mirror 20 is held in a holder 21, which is shown in FIG. 3. The light source 30 comprises an LED light source Luxeon LXZ1-PX01 (with central wavelength of about 556-569 nm), a condenser 32, along with a 560/94 nm BrightLine® single-band bandpass filter 31, manufactured by Semrock. The tube lens 40 is an ITL200 tube lens, from Thorabs, with a focal length of 200 mm. The condenser 32 produces an illuminated area in the plane of the bottom of the sample chamber at the imaging location of approximately 8×8 mm, with the central 5×5 mm area having an intensity variation less than approximately ±10%. The tube lens 40 focuses the collimated beam coming out of the objective lens 25 onto the line camera 10. The optical system comprising the tube lens 40 and the objective lens 25 in this example achieves a magnification of 10×.

Figure 2:
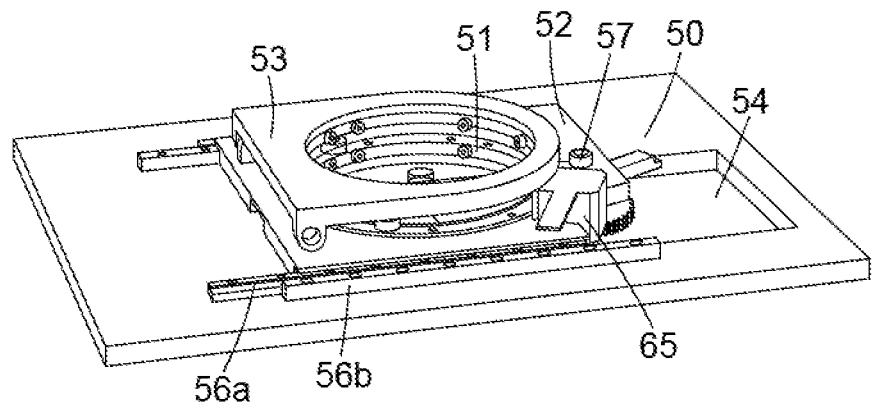
FIG. 2 shows a support for a sample holder which forms part of the system of FIG. 1A or FIG. 1B.

The system further comprises a sample holder 100 comprising a plurality of sample chambers 116 (described in greater detail below, with reference to FIG. 4). As shown in FIG. 2, the sample holder 100 is received by a support 50 configured to receive the sample holder 100. The support 50 comprises a platform 52 comprising a recessed region 51 shaped to conform to the outer dimensions of the sample holder, such that, when placed within the recessed region, the sample holder cannot move laterally.

The platform 52 is provided on linear tracks 56a, 56b attached to the support, and a motor may be provided to drive the platform in either direction along the tracks. The motor (not shown) may drive movement of the platform along the tracks via a rack and pinion arrangement (not shown), for example.

The platform 52 comprises a platform lid 53 which, particularly during imaging, holds the sample holder 100 in a fixed position with respect to the vertical axis, i.e. such that the sample holder 100 does not move upwardly or downwardly.

The platform lid 53 is hingedly connected to the platform, so that it can pivot upwardly and away from the platform 52 about the hinged connection. In particular, the platform lid 53 is configured to move in this way when the platform 52 is translated to an extreme position at one end of the linear tracks 56a, 56b (to the far right, as shown in FIG. 2). This movement is the result of the platform lid 53 engaging with a guide rail (not shown), shaped so as to lift the platform lid 53 at the extreme position.

The sample holder 100 is loaded from above onto the support 50 (i.e. into the recessed region 51 of the platform 52) at the extreme position. In this position, the sample holder 100 rests within the recessed region 51 and is prevented from lateral movement by the recessed region 51. As the platform 52 moves from the extreme position, the platform lid 53 is guided down by the guide rail to press down on the sample holder 100, so that the sample holder 100 is prevented from movement upwardly by the downward force applied by the platform lid 53. That is, the platform lid 53 provides a vertical clamping function. The sample holder 100 is prevented from movement downwardly by being supported by the recessed region 51.

The support comprises a through-hole 54, below the plane at which the sample holder 100 is supported, which allows a portion of the sample holder 100 to be imaged by the line camera 10, from below.

In order to bring different radial lines of sample chambers 116 into line with the line camera 10 for imaging, the support 50 comprises a drive wheel 57 configured to rotate the sample holder 100 (about a vertical axis of the sample holder 100). When a sample holder 100 is held in the support 50, the drive wheel 57 is located adjacent to the rim of the sample holder 100, to frictionally engage the rim of the sample holder. The drive wheel 57 is pressed to the rim using a spring action. The drive wheel is driven by a second motor 55, via a drive belt (not shown).

The drive wheel 57 is configured to disengage from the rim of the sample holder 100 (i.e. the spring action pressing the drive wheel 57 to the rim of the sample holder 100 is relaxed) when the platform 52 is translated to the extreme position at the right-hand end (as shown in FIG. 2) of the linear tracks 56a, 56b. The drive wheel 57 is configured to engage with the rim of the sample holder 100 when the platform 52 is translated away from the extreme position. The drive wheel is configured to rotate the sample holder 100 at a speed of approximately 30° per second.

The support 50 is configured to align the sample holder 100 in a specific position such that the starting position for the imaging is known. The support 50 comprises a dedicated detector (for example, a photodetector, not shown) configured to detect a single alignment structure which is present on the sample holder 100 at a distance from the centre of the sample holder 100 where no other structures are present. This structure defines the absolute position, and then a predetermined offset gives the rotational position of the starting imaging position. The sets the rotational position of the sample holder to within ±500 μm, as measured at the outermost sample chamber. A fine positioning procedure is then done, by translating the platform 52 to position the imaging line in the outermost sample chamber of the first radial line, and imaging the sample chamber. Based on image analysis (for example, comprising edge analysis to find the edges of the sample chamber), the sample holder is rotated until the midpoint of the sample chamber is positioned on the optical axis. This sets the starting position for the imaging to within ±50 μm.

In the use of the device, the sample holder 100 is provided with appropriate samples in sample chambers 116 and images of the samples are gathered using the line camera 10.

Referring to FIG. 1A again, in use, light from the illumination source 30 is incident onto the sample holder 100 from above (via the band-pass filter 31 and condenser 32). The light passes through the sample chambers 116 of the sample holder 100, and is collected by the objective lens 25. After passing through the objective lens 25, the light reflects from the dichroic mirror 20, passes through the tube lens 40, and is then imaged by the line camera 10.

Similarly, in the system shown in FIG. 1B, in use, light from the illumination source 30 is incident onto the sample holder 100 from above (via the band-pass filter 31 and condenser 32). The light passes through the sample chambers 116 of the sample holder 100, and is collected by the objective lens 25. After passing through the objective lens 25, the light passes through the dichroic mirror 20, passes through the tube lens 40, and is then imaged by the line camera 10.

The sample holder 100 is moved in a first linear direction (by translating the platform 52) in the horizontal plane, such that the imaging line of the line camera 10 successively images different lines perpendicular to the radial line along which the sample chambers 116 are distributed.

The speed at which the sample holder is translated is, in this example, matched to the imaging rate (line rate) of the line camera, such that the resultant image is not distorted. The speed s of the linear movement of the sample holder is given by $$s = \frac{\text{pixel width} \times \text{line camera imaging rate}}{\text{magnification}}$$

Here, the pixel width is 3.5 μm, the line camera imaging rate is 48 kHz and the magnification is 10×. This gives a speed s of 16.8 mm/s. This allows imaging of 50 radial lines, each of 50 mm length, within 6 minutes (including the time taken for rotation to each new radial line, and data transfers). A sample holder comprising 384 sample chambers can be fully scanned in 7 minutes. The total analysis time per sample chamber, including movement to the sample chamber, adjusting the focal plane during imaging, and acquiring images within the sample chamber is less than 2 seconds.

Following the completion of the translational movement of the sample holder 100, the sample holder is rotated by the support 50 (using the drive wheel 57) in order to bring another radial line of sample chambers 116 into alignment with the imaging line of the line camera 10. The sample holder 100 is then translated in a linear direction in the opposite direction to the first linear direction, to image the second radial line of sample chambers.

As mentioned, the system comprises an autofocus system 15. The relative positions of the line camera 10, autofocus system 15, objective lens 25, dichroic mirror 20 (not shown in FIG. 3, but its holder 21 is shown) and tube lens 40 (in a system similar to that shown in FIG. 1A) are shown in FIG. 3.

The autofocus system 15 comprises a laser light source (not shown) with wavelength of 785 nm. The laser light 15a passes through the dichroic mirror 20 and the objective lens 25 (in the opposite direction to the light gathered by the objective lens 25 from the sample chambers 116), to be incident onto a bottom surface of the sample holder 100. The autofocus system 15 sets the focal plane at the bottom surface of the sample chambers 116 in the sample holder. The focal plane of the line camera may be set at a predetermined upward offset therefrom (such that the focal plane lies at a plane within the sample chamber 116, above and parallel to the bottom surface of the sample chamber 116), by offsetting the line camera 10 along the optical axis (by between 0 mm and 20 mm).

The autofocus system 15 can adjust the focal position (if necessary) every 0.15 ms. This allows the autofocus system 15 to recheck the focal position approximately every 7 lines read by the line camera 10 (which has an imaging rate of 48 kHz). If the focal position needs to be adjusted, the autofocus system 15 outputs a signal which causes the lens holder 26 (see FIG. 3) to translate the objective lens 25 in order to adjust the focal plane. The lens holder 26 translates the objective lens 25 along an axis perpendicular to a plane of the support 50, with a precision of 1 μm. Movement of the lens holder 26 is driven by a linear actuator (not shown). To image a single sample chamber 116, the line camera 10 may capture thousands of lines (for example, between 10,000 and 15,000), and so the focal plane may be adjusted by the autofocus system 15 hundreds or thousands of times, across each sample chamber 116. Any non-uniformity in the base of the sample chamber 116 can therefore be accounted for in the imaging process.

As a radial line of sample chambers 116 is imaged by the line camera 10, a composite image comprising the plurality of imaged lines is built up. The composite image obtained by the line camera 10 includes all of the sample chambers 116 along the radial line. This composite image may be processed by an image processing algorithm to split the composite into separate image areas, each including one sample chamber 116, for example.

An image analysis system may receive the images taken by the system, and may carry out further image analysis, for example to determine the presence, absence, or amount of microscopic objects and/or to determine the type of microscopic objects (for example, as disclosed in Q-Linea AB's application PCT/EP2017/064713 (WO 2017/216312 A1)).

Figure 4:
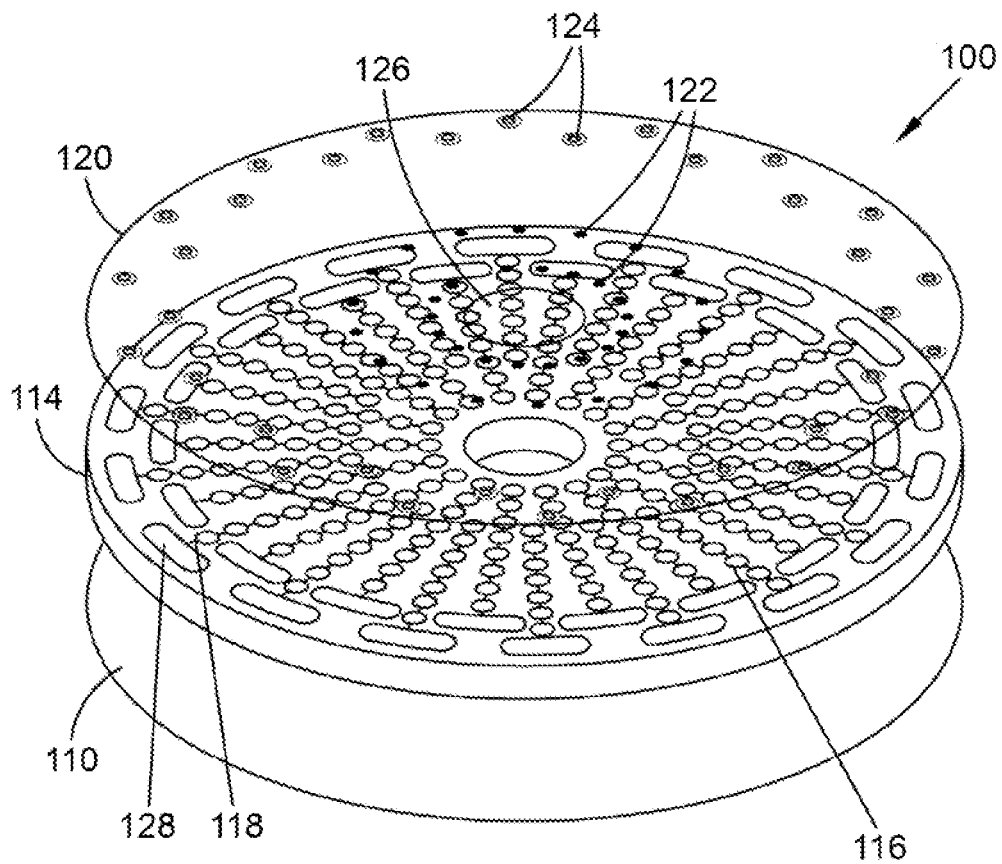
FIG. 4 shows an exemplary sample holder which could be used in the system of FIG. 1A or FIG. 1B.

An exemplary sample holder 100 which is suitable for use with the device is now described in greater detail, with reference to FIG. 4. As seen in this figure, the exemplary sample holder 100 comprises three layers. A first, optically flat, layer 110 forms a base layer. A second layer 114 is placed on top of the first layer 110 and is formed with volumes (holes) forming sample chambers 116 for holding sample fluids. The sample chambers 116 are connected via channels 118. There are multiple channels 118 each with their own sample chambers 116. The first layer 110 closes the bottoms of the sample chambers 116. A third layer 120 covers the tops of the sample chambers 116 and the channels 118. The third layer 120 includes openings 122 at one end of each of the channels 118 to allow for dispensing of sample fluid(s) into each channel 118, and then along the channels 118 to fill all of the sample chambers 116. The third layer 120 also includes vents 124 at the other ends of each of the channels 118 to allow for gas to leave the channels 118 as they are filled with the sample fluid(s). The vents 124 and optionally also the openings 122 may be covered by a gas permeable membrane. At the end of each channel 118 is a reservoir 128 for any excess of the sample fluid.

All of the layers 110, 114, 120 have a central hole 126 that is used during loading of the sample holder 100 into the device for microscopy-based imaging of the samples.

The channels 118 extend outward from the centre of the sample holder 100 toward the outer circumference, and they are spaced about along radial lines.

The first layer 110 and the third layer 120 are transparent to light in the wavelengths used for imaging the samples and are typically transparent to visible light. The second layer 114 need not be transparent, although it may be.

In case of use in a fluorescent analysis, the first layer 110 second layer 114, and third layer 120 should be non-fluorescent in the relevant wavelength region (for example, 450-700 nm).

Figure 5:
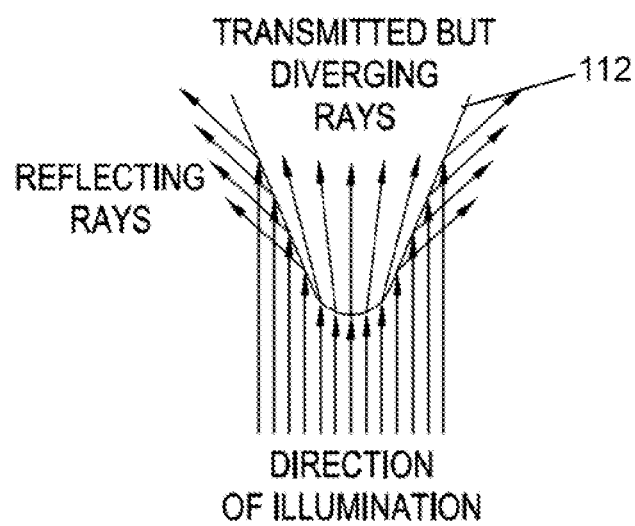
FIG. 5 illustrates alight beam directed at a focal structure (in this case, a pyramid indentation) on an exemplary sample holder and the resultant reflection and refraction of light rays.

Focus-checking structures 112 (for example, pyramid-shaped indentations or grooves), may be provided in the first layer 110—such a focus-checking structure 112 is shown in FIG. 5. Such structures are described in Q-Linea AB's application PCT/EP2017/064715 (WO 20171216314 A1)). The focus-checking structures may be provided in the bottom of each sample chamber 116, at the end of each channel 118, adjacent each sample chamber 116 or adjacent each channel 118. In another arrangement each channel 118 may have a plurality of associated focal structures 112 spaced at set distances from the centre of the sample holder 110, such that the focal structures 112 lie along concentric circles centred on the centre of the sample holder 100. The focal structures 112 may be provided between adjacent sample chambers 116, spaced inwardly of the outer width of the sample chambers 116. The focal structures 112 may be spaced to appear in every 10th line, every 50th line, or every 100th line, captured by the line camera.

As shown in FIG. 5, a collimated light beam perpendicular to the flat surface of the first layer 110 gives rise to total internal reflection on the sidewalls of the focus checking structure 112. In the case of a less than perfectly collimated beam, the reflection may not be total, but it is still sufficient for contrast detection as detailed below. As a result of the (total) internal reflection, when viewed from the top, the majority of the area of the focus-checking structure 112 appears dark. If the line camera 10 is focused exactly on the base of the focus-checking structure 112, where the sidewalls meet and form the point of the pyramid indentation, then a bright spot appears. The contrast between this bright spot and the darker area of the surrounding part of the pyramid changes rapidly with changing focal plane.

As explained above, as the line of sample chambers 116 is imaged by the line camera 10, a composite image comprising the plurality of imaged lines is built up. The composite image obtained by the line camera 10 includes all of the sample chambers 116 and focal structures 112 along the channel 118. This composite image may be processed by an image processing algorithm to split the composite into separate image areas, each including a sample chamber and at least one focal structure 112. In one example, the focal structure 112 associated with a given sample chamber 116 comprises two pyramid indentations at each end of the sample chamber 116. In another example, there is a focal structure 112 comprising four pyramid indentations 30 at the end of each sample chamber 116. In each case the geometry (i.e. layout of the pyramid indentations) may be the same, but the subsequent association of a focal structure 112 with a sample chamber 116 in the imaging processing is different.

An image analysis system may check the images to determine if they are in focus by identifying the focal structures 112 and checking whether or not they are in focus (as described for example in Q-Linea AB's application PCT/EP2017/064711 (WO 2017/216310 A1)). If any of the images are not in focus then an indication can be given to the user and/or remedial action can be taken.

Figure 6A:
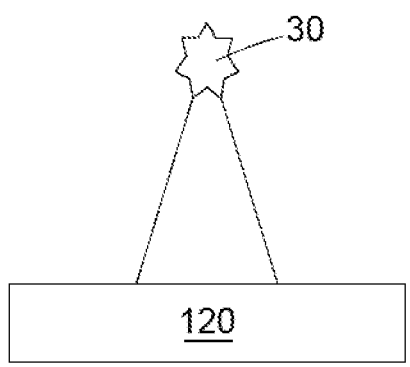
FIG. 6A shows the light source incident on an optically active layer in a sample holder.
Figure 6B:
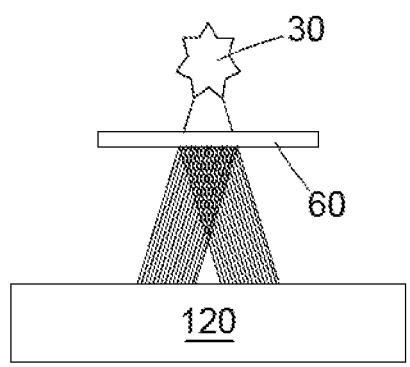
FIGS. 6B and 6C show modifications to the light source to counteract the effect of such an optically active layer.
Figure 6C:
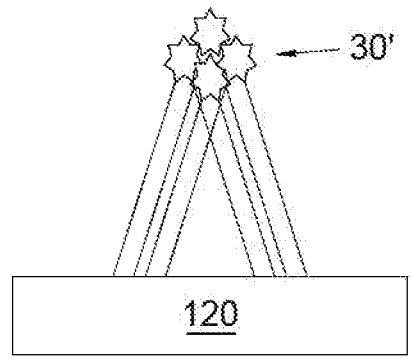

Referring to FIGS. 6A to 6C, in some embodiments, the third layer 120 of the sample holder 100 may be optically active, and causes non-uniformity in the light incident onto the sample chambers. In particular, the optically active layer may comprise structures that refract or block light so that the illumination intensity as perceived over the imaged areas is not even, but shows variations dependent on the shape of the third layer 120. Such variations may be detrimental to the image, and subsequent image processing. To counteract this, a diffuser 60 may be positioned between the illumination source 30 and the third layer 120 of the sample holder 100 (as shown in FIG. 68). The diffuser may be an optical diffuser which diffuses the light evenly, or it may be an engineered diffuser comprising an engineered surface having structures designed to cancel out the light intensity variations caused by the optically active part of the sample holder. Alternatively, a plurality of light sources 30' may be provided (as shown in FIG. 6C), positioned to provide different path lengths for illumination of the sample chambers. The diffuser 60 or plurality of light sources 30' act to provide a more even illumination to the sample chambers.

In the foregoing description, the sample holder 100 comprises sample chambers aligned along radial lines. The movement of such a sample holder (in order to image the sample chambers) is shown in more detail in FIG. 7.

Figure 7:
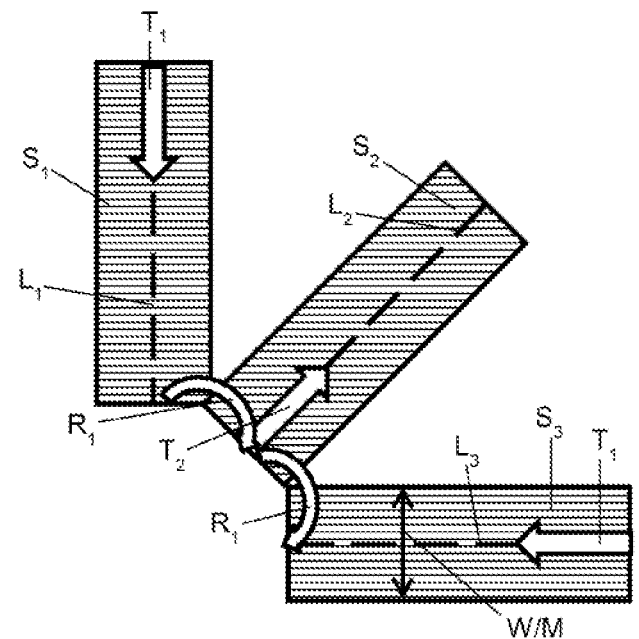
FIG. 7 shows the movement of the sample holder where the sample holder comprises sample chambers following radial lines.

The sample chambers (not shown in FIG. 7) on the sample holder are distributed along strips $S_1$, $S_2$ and $S_3$, broadly following radial lines $L_1$, $L_2$ and $L_3$. The strips are defined by the line camera active line length W (number of pixels used×pixel length—the line camera active line length may be smaller than the maximum line length, because the number of pixels used may be fewer than the total number of pixels) divided by the magnification M, and the path the imaging line takes over the sample holder (as a result of movement of the sample holder relative to the imaging line). There may be a plurality of sample chambers along each strip $S_1$, $S_2$, $S_3$ or there may be one long sample chamber per strip. Alternatively, there may be just one sample chamber, imaged in a plurality of strips $S_1$, $S_2$, $S_3$. In FIG. 7, the strips are shown as not overlapping, but in other embodiments they may overlap (or abut, without significant overlap).

In FIG. 7, the support translates the sample holder linearly in a first direction $T_1$ (by translating the platform 52), which moves the sample holder such that the first strip $S_1$ moves across the imaging line from a radially outward position towards the centre of the sample holder. The first strip $S_1$ is imaged as the strip is translated over the imaging line. When sample holder is positioned such that the imaging line is at the radially inward end of the first strip $S_1$, the sample holder is rotated using the drive wheel 57 (in direction $R_1$, which in this case is clockwise) to bring the radially inward imaging position of the second strip $S_2$ into alignment with the imaging line of the line camera. The support then translates the sample holder linearly in a second direction $T_2$, (the opposite direction from $T_1$) by translating the platform 52 which in this case moves the second strip $S_2$ across the imaging line from a radially inward position towards the outer edge of the sample holder. The second strip $S_2$ is thus imaged. When the sample holder is positioned such that the imaging line is positioned at the radially outward end of the first strip $S_2$, the sample holder is rotated (in direction $R_1$, using the drive wheel 57) to bring the radially outward imaging position on the third strip $S_3$ into position above the imaging line. The support then translates the sample holder linearly in the first direction $T_1$ by translating the platform 52, for imaging of the third strip $S_3$.

In alternative embodiments, the sample holder comprises sample chambers aligned along concentric circles (positioned at different radii). The movement of the sample holder in order to image the sample chambers is shown in more detail in FIG. 8.

Figure 8:
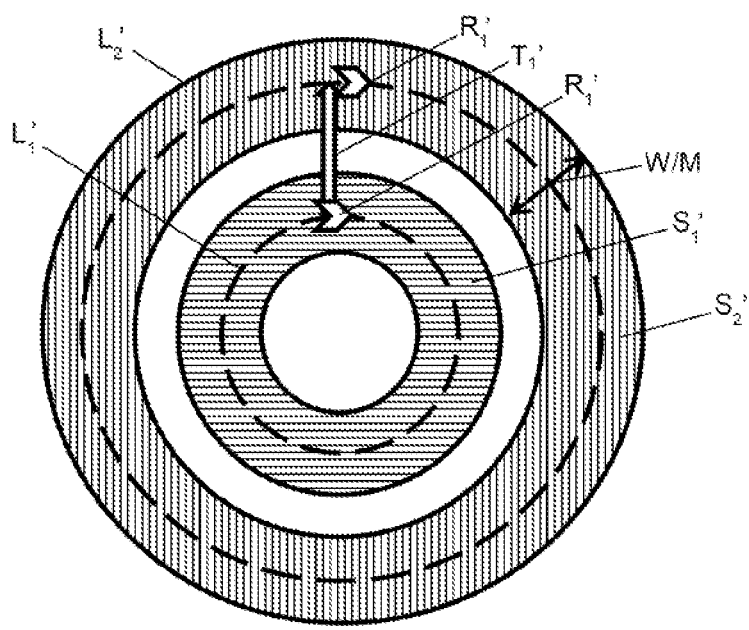
FIG. 8 shows the movement of the sample holder where the sample holder comprises sample chambers following concentric circles (each at a different radius)

The sample chambers (not shown in FIG. 8) on the sample holder are distributed along strips $S_1'$ and $S_2'$, broadly following concentric circles lines $L_1'$ and $L_2'$. The strips are defined by the line camera active line length W (number of pixels used×pixel length) divided by the magnification, and the path the imaging line takes over the sample holder (as a result of movement of the sample holder relative to the imaging line). There may be a plurality of sample chambers along each strip $S_1'$, $S_2'$ or there may be one long sample chamber per strip. Alternatively, there may be just one sample chamber on the sample holder, imaged in a plurality of strips $S_1'$, $S_2$. In FIG. 8, the strips are shown as not overlapping, but in other embodiments they may overlap (or abut, without any significant overlap).

In FIG. 8, the support rotates the sample holder in a first direction $R_1'$ (which in this case is clockwise) using the drive wheel 57, which moves the sample holder such that the first strip $S_1'$ moves across the imaging line. The first strip $S_1'$ is imaged as the strip is moved over the imaging line. When the sample holder is positioned such that the imaging line returns to the initial position on the first strip $S_1'$ (i.e. when the sample holder has been rotated by 360°), the sample holder is translated linearly in direction $T_1'$ by translating the platform 52, which in this case causes the imaging line to be positioned at a radially outward position, such that a position of the second strip $S_2'$ is brought into alignment with the imaging line of the line camera. The support then rotates the sample holder using the drive wheel in the first direction $R_1'$ (although the support could instead rotate the sample holder in the opposite direction, i.e. anti-clockwise), which moves the sample holder such that the second strip $S_2'$ moves across the imaging line. The first strip $S_2'$ is imaged as the strip is moved over the imaging line.

In alternative embodiments, the sample holder comprises sample chambers aligned along parallel lines. The movement of the sample holder in order to image the sample chambers is shown in more detail in FIG. 9.

Figure 9:
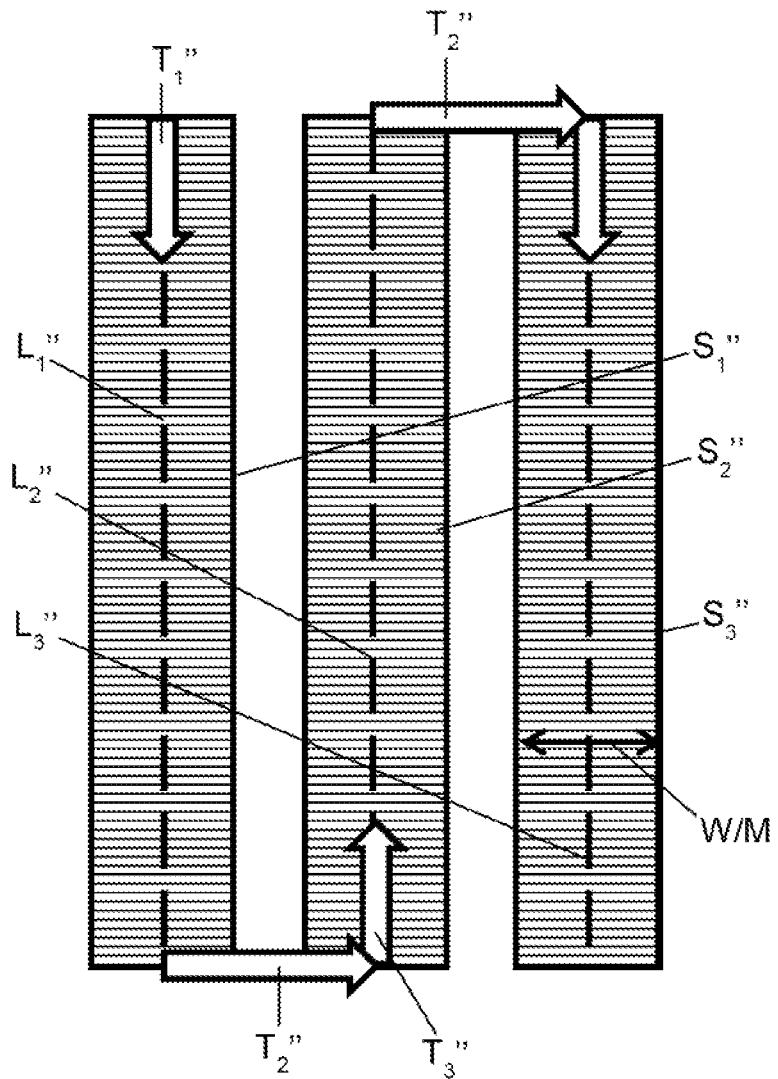
FIG. 9 shows the movement of the sample holder where the sample holder comprises sample chambers following parallel lines.

The sample chambers (not shown in FIG. 9) on the sample holder are distributed along strips $S_1''$, $S_2''$ and $S_3''$ broadly following parallel lines $L_1''$, $L_2''$ and $L_3''$. The strips are defined by the line camera active line length W (number of pixels used×pixel length) divided by the magnification M, and the path the imaging line takes over the sample holder (as a result of movement of the sample holder relative to the imaging line). There may be a plurality of sample chambers along each strip $S_1''$, $S_2''$, $S_3''$ or there may be one long sample chamber per strip. Alternatively, there may be just one sample chamber on the sample holder, imaged in a plurality of strips $S_1''$, $S_2''$, $S_3''$. In FIG. 9, the strips are shown as not overlapping, but in other embodiments they may overlap (or abut, without any significant overlap).

In FIG. 9, the support translates the sample holder linearly in a first direction $T_1$ by translating the platform 52, which moves the sample holder such that the first strip $S_1$ moves across the imaging line. The first strip $S_1$ is imaged as the strip is translated over the imaging line. When the sample holder is positioned such that the imaging line is at a far end of the first strip $S_1$, the support then translates the sample holder by translating the platform 52 linearly in a second direction $T_2''$, (at an angle to $T_1''$, and in this case perpendicular to $T_1''$) to bring an end of the second strip $S_2''$ into alignment with the imaging line of the line camera. The support translates the sample holder linearly in a third direction $T_3''$ (opposite to $T_1''$) by translating the platform 52, which moves the sample holder such that the first strip $S_2$ moves across the imaging line. When the sample holder is positioned such that the imaging line is at a far end of the second strip $S_2''$, the support then translates the sample holder linearly in the second direction $T_2$ again (by translating the platform 52), to bring an end of the third strip $S_3''$ into alignment with the imaging line of the line camera. The support then translates the sample holder linearly in the first direction $T_1''$ again (by translating the platform 52), which moves the sample holder such that the third strip $S_3''$ moves across the imaging line.

Where the sample holder comprises sample chambers aligned along parallel lines, there is no need for the drive wheel 57 in the system described in FIGS. 1A and 1B, 2 and 3. In that case, the platform 52 may be provided on additional linear tracks attached to the support, which are at an angle to, for example perpendicular to, the tracks 56a, 56b shown in FIG. 2. Movement along these tracks may be driven by the same motor which drives the motion along the first linear tracks 56a, 56b, or by a different motor.

The invention claimed is:

1. A method for performing microscopy-based imaging of samples comprising:
    loading a sample holder onto a support configured to receive the sample holder, wherein the sample holder includes a plurality of antimicrobial agents, each at a plurality of concentrations, for performing an antimicrobial susceptibility testing (AST) analysis;
    moving the sample holder in a first direction, from a starting position on a first strip of the sample holder, to move the sample holder relative to an imaging line of a line camera, to capture an image of the first strip of the sample holder;
    determining a focal plane using an autofocus system as the sample holder is moved in the first direction;
    in response to receiving a signal from the autofocus system, a lens holder moves an objective lens along an optical axis to adjust the focal plane; and
    moving the sample holder in a second direction, to align the imaging line of the line camera with a position on a second strip of the sample holder,
    wherein the first and second strips follow radial lines, and wherein the image of the first strip is captured by linearly translating the sample holder across the imaging line of the line camera, and wherein the imaging line of the line camera is aligned with the position on the second strip of the sample holder by rotating the sample holder.

2. The method according to claim 1, wherein the image captured by the line camera is an area image constructed from a plurality of serially captured line images.

3. The method according to claim 1, wherein the autofocus system adjusts the focal plane at least every 0.5 ms as the sample holder moves.

4. The method according to claim 1, wherein the autofocus system determines an initial focal plane when the sample holder is loaded onto the support.

5. The method according to claim 1, wherein light from an autofocus system light source passes through a dichroic mirror, to pass through the objective lens and to be incident onto a bottom surface of the sample holder, and light from the sample holder that has passed through the objective lens is reflected by the dichroic mirror towards the line camera.

6. The method according to claim 1, wherein light from an autofocus system light source is reflected by a dichroic mirror, to pass through the objective lens and to be incident onto a bottom surface of the sample holder, and light from the sample holder that has passed through the objective lens passes through the dichroic mirror towards the line camera.

7. The method according to claim 1, wherein the objective lens is moved along an axis perpendicular to a plane defined by a plane of the sample holder, and wherein the optical axis is vertical and the objective lens is moved substantially vertically upwardly or downwardly.

8. The method according to claim 1, wherein the line camera images the sample holder from below the sample holder.

9. The method according to claim 1, wherein the sample holder comprises a plurality of sample chambers, and:
    a first plurality of sample chambers are distributed along the first strip, and a second plurality of sample chambers are distributed along the second strip; or
    a single sample chamber is located along one of the first or second strips, and a plurality of sample chambers are distributed along the other of the second or first strip; or
    a single sample chamber is located along the first strip, and a single sample chamber is located along the second strip.

10. The method according to claim 1, wherein the support comprises a platform lid and a vertical clamping force is applied by the platform lid to the sample holder to maintain the sample holder in a fixed position with respect to the vertical axis, and wherein the sample holder is held horizontally.

11. The method according to claim 1, comprising aligning the sample holder in a specific position such that the starting position for imaging is known.

12. The method according to claim 1, comprising illuminating the sample holder with a monochromatic or narrowband light source from above the sample holder.

13. The method according to claim 1, comprising moving the sample holder by translating the sample holder linearly at a speed selected to give an undistorted image, taking into consideration the line camera imaging rate, the width of the pixels in the line camera imaging line, and the magnification provided by the objective lens.

14. The method according to claim 1, comprising translating the sample holder linearly at a speed of 10 to 20 millimetres per second (mm/s) and rotating the sample holder at a speed of approximately 30° per second.

15. The method according to claim 1, comprising checking the image to check whether it is in focus by checking whether a focal structure is in focus.

16. The method according to claim 1, wherein the sample holder comprises samples which include pathogens present in a microbiological growth medium for performing a broth microdilution assay.

17. The method according to claim 1, comprising imaging the sample holder at a plurality of time points.

18. The method according to claim 17, comprising determining at least one of: the presence or absence, or amount of growth of pathogens in the sample chamber(s) at each time point.

* * * * *